United States Patent
Akiyama

(10) Patent No.: US 7,602,693 B2
(45) Date of Patent: Oct. 13, 2009

(54) DATA RECORDING APPARATUS

(75) Inventor: Junichi Akiyama, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 513 days.

(21) Appl. No.: 11/515,397

(22) Filed: Sep. 5, 2006

(65) Prior Publication Data
US 2007/0053101 A1 Mar. 8, 2007

(30) Foreign Application Priority Data
Sep. 5, 2005 (JP) ............................ 2005-256466

(51) Int. Cl.
*G11B 9/00* (2006.01)
(52) U.S. Cl. .................. 369/126; 369/288; 369/94; 369/99
(58) Field of Classification Search ............ 369/94, 369/99, 100, 101, 126, 112.27, 276, 288; 385/39; 438/238; 428/446
See application file for complete search history.

(56) References Cited

U.S. PATENT DOCUMENTS

| | | | |
|---|---|---|---|
| 4,340,953 A | | 7/1982 | Iwamura et al. |
| 5,385,865 A * | | 1/1995 | Nieder et al. ............... 438/238 |
| 6,125,095 A * | | 9/2000 | Gemma et al. .............. 369/126 |
| 6,157,610 A * | | 12/2000 | Hagiwara ................. 369/275.5 |
| 6,614,960 B2 * | | 9/2003 | Berini ......................... 385/39 |
| 6,638,627 B2 * | | 10/2003 | Potter .......................... 428/446 |
| 6,697,317 B2 * | | 2/2004 | Hagiwara ................... 369/126 |
| 6,850,480 B1 * | | 2/2005 | Naito et al. ................. 369/288 |
| 6,975,575 B2 * | | 12/2005 | Gibson et al. ............... 369/100 |
| 7,170,843 B2 * | | 1/2007 | Hong et al. ................. 369/101 |
| 7,218,600 B2 * | | 5/2007 | Cho et al. ................... 369/126 |
| 2001/0030935 A1 * | | 10/2001 | Hirao et al. ................. 369/276 |
| 2002/0114256 A1 * | | 8/2002 | Tsu ............................. 369/101 |
| 2003/0053399 A1 * | | 3/2003 | Yoo et al. .................... 369/126 |
| 2003/0081527 A1 * | | 5/2003 | Gibson et al. ............... 369/101 |
| 2005/0190684 A1 * | | 9/2005 | Kley ............................ 369/126 |
| 2006/0153045 A1 * | | 7/2006 | Lee et al. ................ 369/112.27 |
| 2008/0043598 A1 * | | 2/2008 | Ono et al. .................... 369/126 |

FOREIGN PATENT DOCUMENTS

JP  55-150268  11/1980

* cited by examiner

*Primary Examiner*—Thuy N Pardo
(74) *Attorney, Agent, or Firm*—Nixon & Vanderhye, PC

(57) ABSTRACT

A data recording apparatus includes a recording medium which includes a semiconductor substrate, a first insulating layer formed on one surface of the substrate, a second insulating layer formed on the first insulating layer and is made to accumulate electric charge, an electrode layer formed on the other surface, and an insulating area which penetrates the insulating layers; and an electrode which applies a voltage to the medium. A depth from an interface between the substrate and the first insulating layer to the bottom of the insulating area is more than a maximum depth of a depletion layer, $W_{max}$ represented by $$W_{max} = \sqrt{2\epsilon_0 \epsilon_i \times 2|\phi_f|/qN_d}$$

where $\epsilon_0$, $\epsilon_i$, $|\phi_f|$, q, and $N_d$ are a dielectric constant of vacuum, a relative dielectric constant, an absolute value of the Felmi potential of the substrate, an electric charge of an electron, and an impurity concentration of the substrate, respectively.

8 Claims, 10 Drawing Sheets

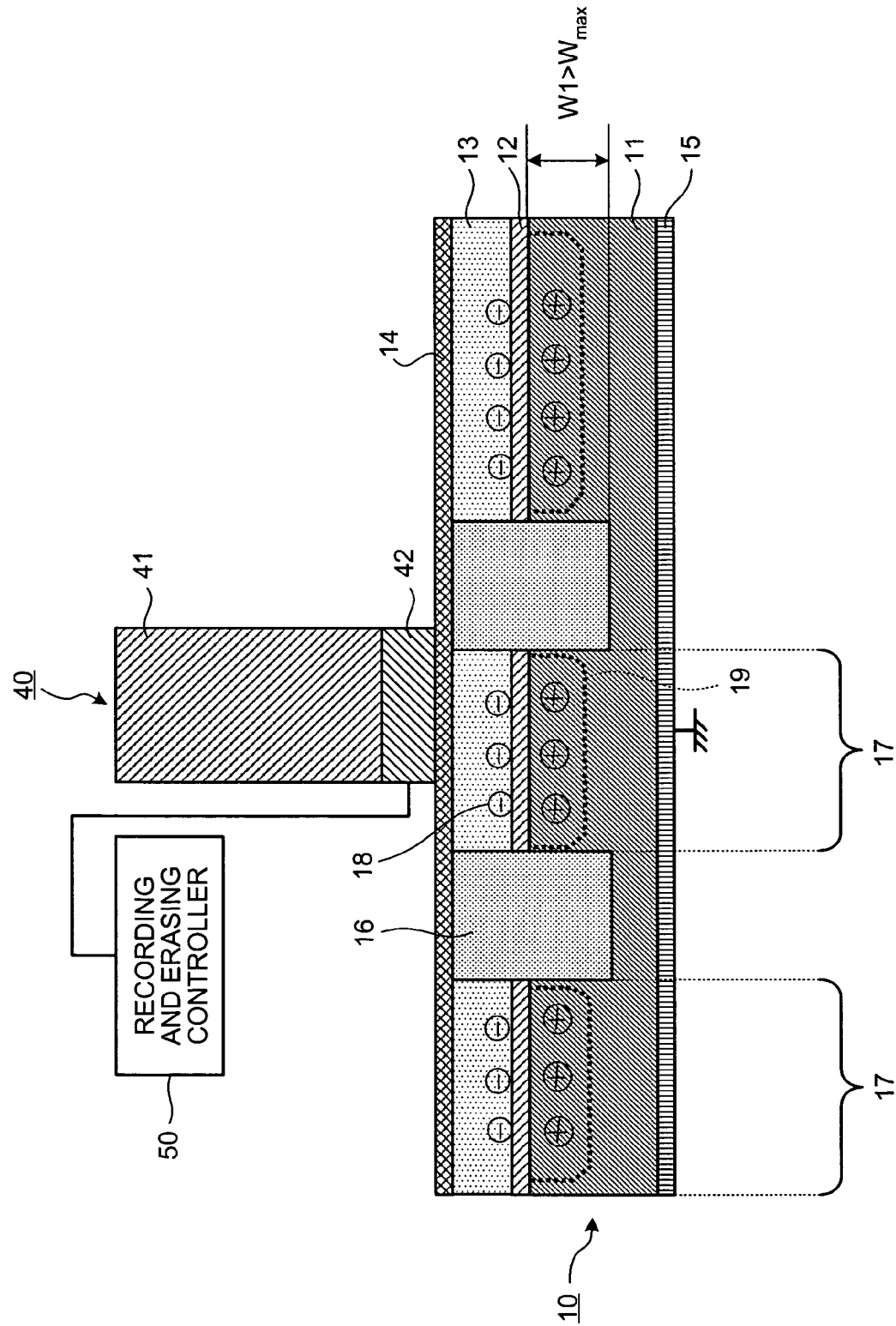

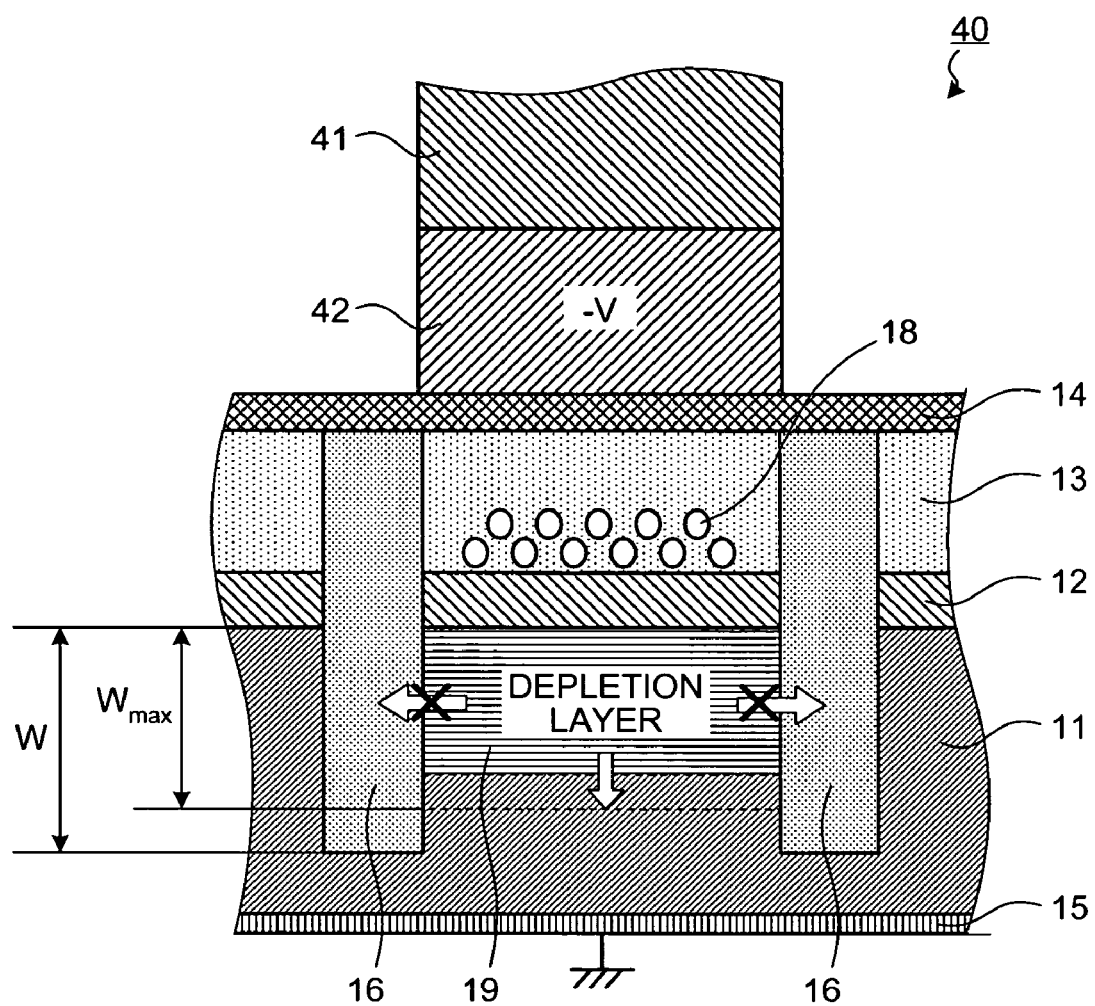

DATA RECORDING APPARATUS

CROSS-REFERENCE TO RELATED APPLICATIONS

This application is based upon and claims the benefit of priority from the prior Japanese Patent Application No. 2005-256466, filed on Sep. 5, 2005; the entire contents of which are incorporated herein by reference.

BACKGROUND OF THE INVENTION

1. Field of the Invention

The present invention relates to a data recording apparatus which records data on nonvolatile, semiconductor-based recording medium.

2. Description of the Related Art

Conventionally, semiconductor memory devices such as an optical disc, a magnetic disc, and a flash memory have been used as a storage memory for data recording. Such a storage memory has an increasing difficulty in realizing high capacity and high speed in the future. Accordingly, a good alternative with small size, high capacity, and high speed as well as low cost has been desired to be put into practical use.

Under this background, it has been expected to put a data recording apparatus using semiconductor-based recording medium with the Metal Nitride Oxide Semiconductor (MNOS) structure which allows recording, reproducing and erasing of data, and a long-term storage of the recorded data, into practical use as one possibility of future data memory devices with high capacity and high speed. As such a data recording apparatus, a semiconductor disc memory device is disclosed and proposed in JP-A No. S55-150268 (KOKAI), for example. In this semiconductor disc memory device where a first insulating film is formed on a semiconductor substrate and a second insulating film having an electric charge accumulating function is formed on the first insulating film, a recording electrode to which a recording signal voltage is applied is made to relatively shift, and an electric charge corresponding to the recording signal voltage is accumulated to the second insulating film through the first insulating film, so that data recording is performed.

Specific structure and function of such a data recording apparatus will be briefly described below. A conventional data recording apparatus using the MNOS medium includes a recording medium that consists of a semiconductor substrate which is made of an n-type silicon (Si); a silicon oxide film ($SiO_2$) which is formed on one surface of the semiconductor substrate and is several nanometers in thickness; a silicon nitride film ($Si_3N_4$) which is formed on the silicon oxide film ($SiO_2$) and is several tens of nanometers in thickness; a protection film which is made of carbon or the like and formed on the silicon nitride film ($Si_3N_4$) and; Fomblin®-based lubricant which is thinly coated on the protection film; and an electrode which is made of aluminium and formed on the other surface of the semiconductor substrate, for example.

The data recording apparatus using the MNOS medium further includes a needle electrode having an insulating support body which is made of sapphire or the like and relatively shifts by floating from or directly contacting with the recording medium, and a metal film which is made of tungsten or the like and deposited on a surface of the insulating support body; and a control circuit for data recording and erasing which is connected to the needle electrode.

In this data recording apparatus, the control circuit for data recording and erasing controls a voltage corresponding to a recording signal to be applied between the needle electrode and the semiconductor substrate via the aluminium electrode formed on the other surface of the semiconductor substrate. Due to a tunnel effect, an electric charge corresponding to the recording signal is accumulated in the silicon nitride film ($Si_3N_4$) through the silicon oxide film ($SiO_2$), and thereby the data is recorded.

Since a depletion layer is formed in the semiconductor substrate depending on the accumulated electric charge, using the needle electrode as an electrode for detecting capacitance when reproducing the recorded data allows sensitive reproduction of whether the depletion layer is present or not, i.e., whether the recorded data is present or not.

In this data recording apparatus, a high speed data recording can be realized by applying a positive voltage pulse to the needle electrode. Specifically the positive voltage pulse has an amplitude of approximately several volts to 30 volts and a pulse width of several nanoseconds to several tens of nanoseconds or less. Moreover, at least ten years of secure storage and readout of data under a normal conservation condition is guaranteed.

However, the conventional data recording apparatus as described above, has a problem that a sufficient data erasing cannot be achieved even if a negative voltage pulse is applied to the needle electrode as for erasing the recorded data. Specifically the negative voltage pulse is, for example, 50 volts or more in amplitude and 200 nanoseconds or more in pulse width, which is more than that necessary for data recording.

In the conventional data recording apparatus as described above, data erasing characteristics is significantly inferior to data recording characteristics in speed. Specifically, when the pulse width is short, no matter how large the voltage for data erasing is, it is difficult to erase the data completely. This problem has been a major obstacle for realization of the data recording apparatus, and an established technology for solving this problem has been strongly desired.

SUMMARY OF THE INVENTION

According to one aspect of the present invention, a data recording apparatus includes a recording medium. The recording medium includes a semiconductor substrate; a first insulating layer which is formed on a first surface of the semiconductor substrate; a second insulating layer which is formed on the first insulating layer and is made to accumulate electric charge; an electrode layer which is formed on a second surface of the semiconductor substrate; and an insulating area which penetrates the first and the second insulating layers. The apparatus also includes an electrode that applies a voltage to the recording medium. A depth from an interface between the semiconductor substrate and the first insulating layer to the bottom of the insulating area is more than a maximum depth of a depletion layer, $W_{max}$ which is represented by $$W_{max} = \sqrt{2\epsilon_0 \epsilon_i \times 2|\phi_f|/qN_d}$$

where $\epsilon_0$ is a dielectric constant of vacuum, $\epsilon_i$ is a relative dielectric constant, $|\phi_f|$ is an absolute value of the Felmi potential of the semiconductor substrate, q is an electric charge of an electron, and $N_d$ is an impurity concentration of the semiconductor substrate.

BRIEF DESCRIPTION OF THE DRAWINGS

FIG. 1A shows a data recording apparatus according to a first embodiment of the present invention;

FIG. 1C is a cross-sectional view of the data recording apparatus according to the first embodiment, illustrating a data erasing mechanism;

DETAILED DESCRIPTION OF THE INVENTION

Figure 1B:
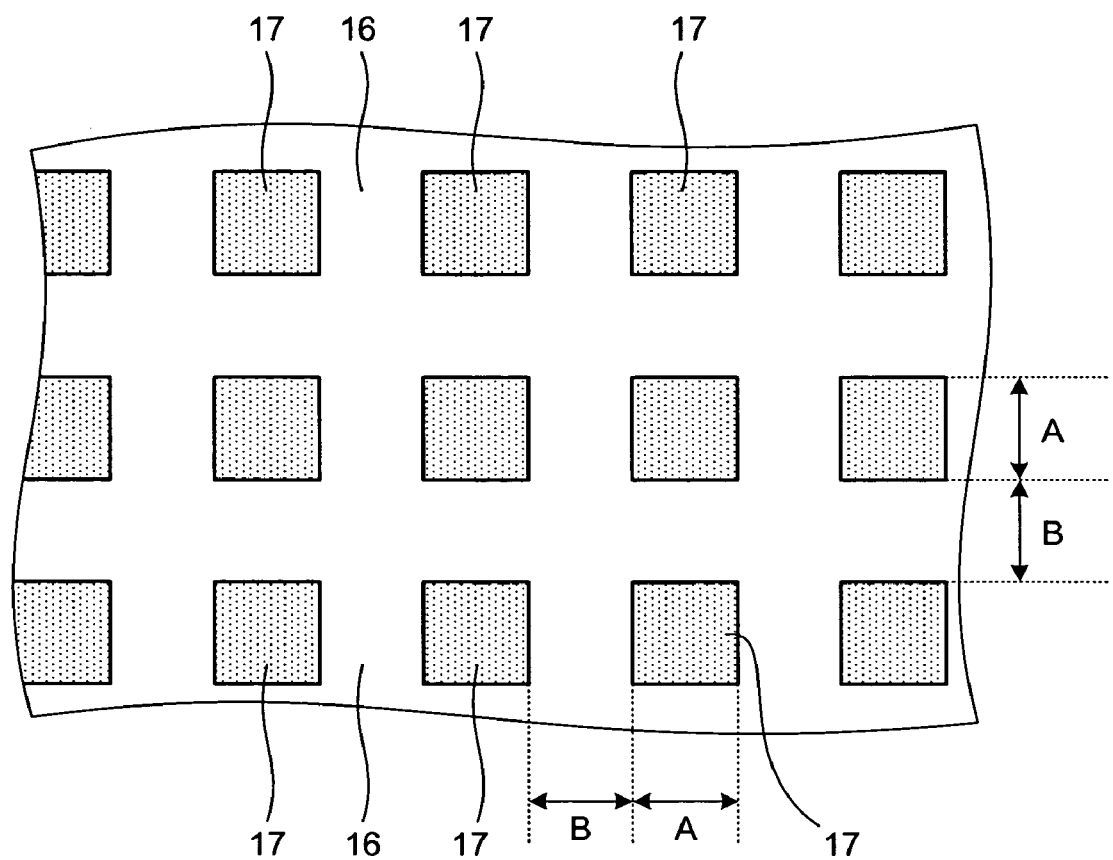
FIG. 1B is a top view of a substantial part of a recording medium shown in FIG. 1A.

Exemplary embodiments of a data recording apparatus according to the present invention will be described in detail with reference to the accompanying drawings. The present invention is not limited by the following description, and accordingly various modifications may be made without departing from the scope of the invention. In the accompanying drawings, the scale of the figures and the members shown in the figures may vary depending on each figure for the sake of better understanding.

FIG. 1A shows a main structure of a data recording apparatus according to a first embodiment of the present invention. The data recording apparatus according to this embodiment realizes high speed recording, reproducing, and erasing of data with high capacity, and employs a semiconductor-based recording medium having the Metal Nitride Oxide Semiconductor (MNOS) structure which allows long-term storage of the recorded data. The recording medium having the MNOS structure has a structure such that an electric charge is accumulated in an interface trap between two insulating film layers, i.e., an oxide film (silicon dioxide film) and a nitride film.

The data recording apparatus according the present embodiment will be explained below. The data recording apparatus with the MNOS medium according to the present embodiment includes a recording medium 10 having the MNOS structure; a recording and reproducing probe 40; and a recording and erasing controller (circuit) 50 as shown in FIG. 1A.

The recording medium 10 includes a semiconductor substrate 11; a first insulating layer 12 which is formed on one surface of the semiconductor substrate 11; a second insulating layer 13 which is formed on the first insulating layer 12 and has an electric charge accumulating function; a protection layer 14 which is formed on the second insulating layer 13; a lubricant (not shown) which is coated on the protection layer 14; an electrode layer 15 which is formed on the other surface of the semiconductor substrate 11; and a third insulating layer 16 which is formed from the surface of the second insulating layer 13 to a predetermined depth of the semiconductor substrate 11.

For example, the semiconductor substrate 11 is a single-crystal substrate or a polycrystal substrate consisting of an n-type silicon or a p-type silicon. The first insulating layer 12 is a silicon oxide film ($SiO_2$) whose thickness is approximately several nanometers, the second insulating layer 13 is a silicon nitride film ($Si_3N_4$) whose thickness is approximately several tens of nanometers, and the protection layer 14 is a carbon whose thickness is equal to or less than several atomic layers, for example.

The lubricant is Fomblin®-based lubricant for example, to be coated on the protection film very thinly, and on the second insulating layer 13 with approximately one atomic layer of coating thickness. The electrode 15 is a conductive film such as an aluminium film, for example.

The third insulating layer 16 is made of insulating material such as silicon oxide ($SiO_2$), silicon nitride ($Si_3N_4$), aluminium oxide ($Al_2O_3$), and organic and polymeric materials, for example. The surface of the third insulating layer 16 is positioned at a level with the surface of the second insulating layer 13. The third insulating layer 16 is formed of the above described insulating material filling in a groove which is formed from the surface of the second insulating layer 13 to a predetermined depth of the semiconductor substrate 11.

Here, the dielectric constant of the insulating material used for the third insulating layer 16 is preferably lower than that of the first insulating layer 12 and the second insulating layer 13. When the dielectric constant of the third insulating layer 16 is lower than that of the first insulating layer 12 and the second insulating layer 13, the difference in dielectric constant between the third insulating layer 16 and a recording bit area 17 is made bigger, which allows a data reproduction with an improved sensitivity.

In the data recording apparatus according to the present embodiment, the recording bit area 17 is arranged on the surface of the recording medium 10 in a pattern regulated by the third insulating layer 16. FIG. 1B is a top view of a substantial part of the recording medium 10 shown in FIG. 1A. In the recording medium 10 according to the present embodiment as shown in FIG. 1B, the surface of the recording medium 10 has the recording bit area 17, and a separation area (the third insulating layer 16) which is an area other than the recording bit area 17, i.e., area separating each recording bit area 17. Thus, the recording bit area 17 is separated by the separation area into individual recording bit area 17 and regularly arranged on the surface of the recording medium 10. FIG. 1B shows the surface of the recording medium 10 which is transparently seen through the protection layer 14.

Preferably, the proportion of the pitch A of the recording bit area 17 to the pitch B of the separation area (the third insulating layer 16) is required to be approximately 1 to 1, for example. This requirement is for securing a margin for read-out error in data reproduction and reducing the parasitic capacitance.

In the data recording apparatus according to the present embodiment, the third insulating layer 16 is formed so that the depth (distance) W1 from the interface between the semiconductor substrate 11 and the first insulating layer 12 to the bottom of the third insulating layer 16, is more (farther) than $W_{max}$ which is a maximum depth (distance) of the depletion layer 19 which is formed in the semiconductor substrate 11, depending on the electric charge 18 accumulated in the second insulating layer 13 at the time of data recording. $W_{max}$ is represented by Equation (1):

$$W_{max} = \sqrt{2\epsilon_0 \epsilon_i \times 2|\phi_f|/qN_d} \qquad (1)$$

where $\epsilon_0$ is a dielectric constant of vacuum, $\epsilon_i$ is a relative dielectric constant, $|\phi_f|$ is an absolute value of the Felmi potential of the semiconductor substrate, q is an electric charge of an electron, and $N_d$ is an impurity concentration of the semiconductor substrate.

The maximum depth of the third insulating layer 16 is assumed to be approximately two to three times the $W_{max}$ in the light of manufacturing cost and process.

The recording and reproducing probe 40 includes a needle electrode support body 41; and a recording and reproducing needle electrode 42 which is formed on a bottom surface of the needle electrode support body 41. The needle electrode support body 41 has an insulating property, being made of insulating material such as sapphire. The recording and reproducing needle electrode 42 is formed of a metal film such as tungsten on the bottom surface of the needle electrode support body 41.

The length and width of the recording and reproducing needle electrode 42 on a surface facing the recording medium 10 may be more than the length and width of the recording bit area 17 of the recording medium 10 respectively, and may be smaller than the lengthwise and horizontal pitches of the recording bit area 17 arranged in a regular pattern, respectively.

The recording and erasing controller (circuit) 50 serves to control a recording signal voltage, a readout signal voltage, and a erasing signal voltage which are applied to the recording and reproducing needle electrode 42.

In the data recording apparatus according to the present embodiment as described above, the recording and reproducing needle electrode 42 to which the recording signal voltage (positive voltage pulse) is applied, floats from or contacts directly with the recording medium 10 to shift relatively, and an electric charge corresponding to the recording signal voltage is accumulated in the second insulating layer 13 through the first insulating layer 12, so that data recording is executed.

In other words, when data recording is performed, the recording and reproducing needle electrode 42 floats from and contacts directly with the recording medium 10 to scan the line of the recording bit areas 17 which are arranged on the recording medium 10 in a pattern. Then the recording and erasing controller (circuit) 50 controls to apply a positive voltage pulse corresponding to the recording signal between the recording and reproducing needle electrode 42 and the semiconductor substrate 11 via the electrode layer 15 formed on the other surface of the semiconductor substrate 11. Here, the electric charge (electron) corresponding to the recording signal is accumulated in the second insulating layer 13 through the first insulating layer 12 due to a tunnel effect, so that the data is recorded.

When data erasing is performed, the recording and reproducing needle electrode 42, similarly to the case in data recording as described above, floats from and contacts directly with the recording medium 10 to scan the line of the recording bit areas 17 which are arranged on the recording medium 10 in a pattern. Then the recording and erasing controller (circuit) 50 controls to apply a negative voltage pulse between the recording and reproducing needle electrode 42 and the semiconductor substrate 11 via the electrode layer 15. Here, an electron hole is accumulated from the semiconductor substrate 11 to the second insulating layer 13 through the first insulating layer 12 due to the tunnel effect, so that the data is erased. When a negative voltage pulse for data erasing is applied, the depletion layer 19 is generated on the surface of the semiconductor substrate 11.

In the data recording apparatus having such a structure according to the present embodiment, since the depth (distance) W1 from the interface between the semiconductor substrate 11 and the first insulating layer 12 to the bottom of the third insulating layer 16 is set to a specific depth (distance) as described, the depletion layer 19 will not spread from the recording bit area 17 of the recording medium 10 two-dimensionally toward a horizontal direction of the semiconductor substrate 11 at the time of data erasing.

Figure 2:
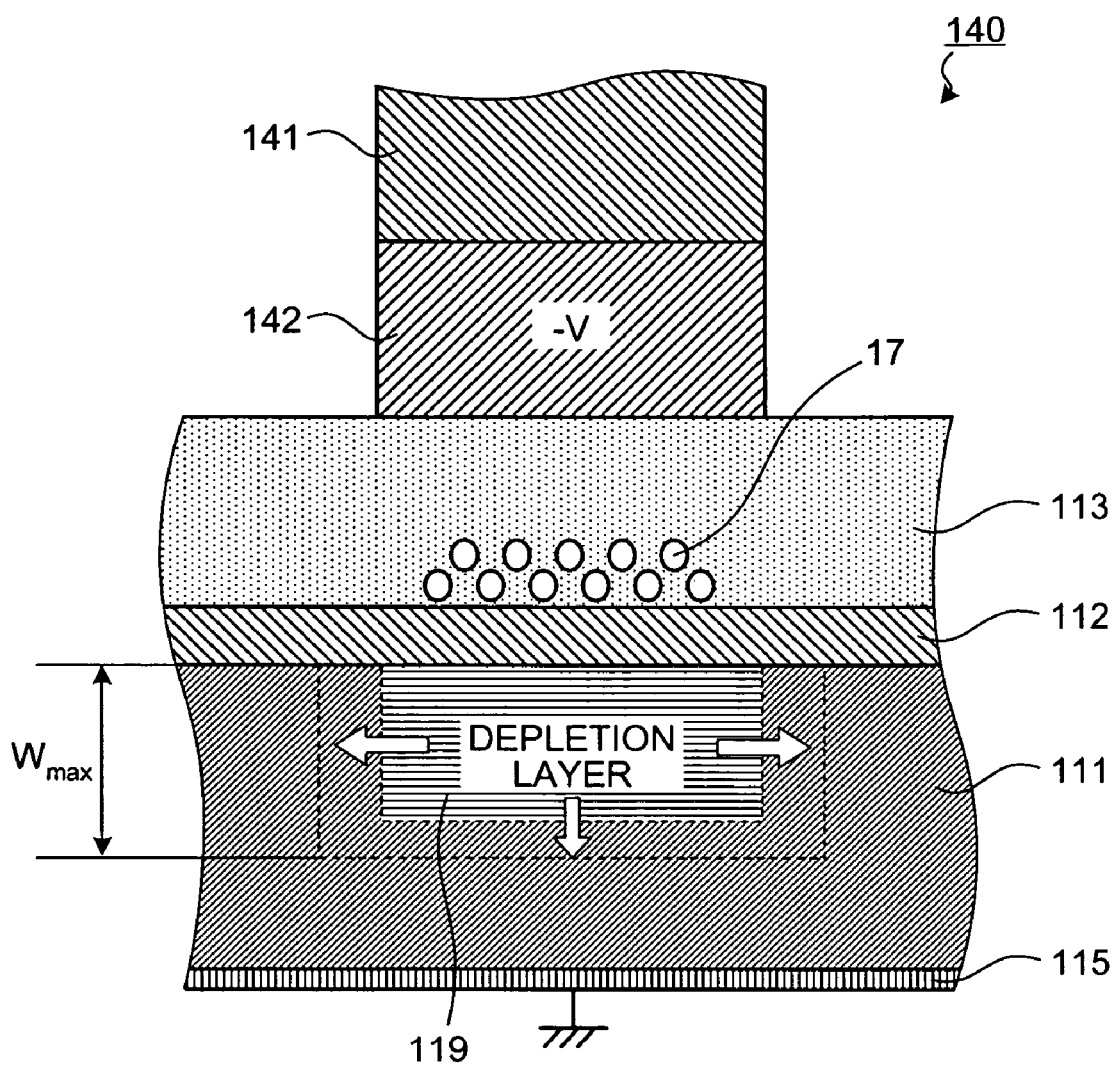
FIG. 2 is a cross-sectional view of a conventional data recording apparatus, illustrating a conventional data erasing mechanism.

In the conventional data recording apparatus as shown in FIG. 2, a negative voltage pulse is applied to a recording and reproducing needle electrode 142 in the case of data erasing, which is contrary to the case of data recording (where a positive voltage pulse is applied). Then the data erasing takes a reverse process to that in data recording, and an electron hole is accumulated from a semiconductor substrate 111 to a second insulating layer 113 through a first insulating layer 112 due to the tunnel effect. When a negative voltage pulse is applied as shown in FIG. 2, a depletion layer 119 is generated on the surface of the semiconductor substrate 111, which is different from the process of data recording.

Moreover, as the negative voltage pulse is increased, the depth of the depletion layer 119 becomes increased accordingly and the depletion layer 119 reaches the maximum depth calculated using Equation (1), and further spreads two-dimensionally toward the horizontal direction of the semiconductor substrate 111 depending on two-dimensional spreading of the electric field intensity which is generated from the recording and reproducing needle electrode 142. This phenomenon is largely different from the process of data recording (see Hisayoshi Yanai et al., "Physics of Semiconductor Device (II)", Corona Publishing Co., Ltd., and S. M. SZE, "Physics of Semiconductor Devices", Wiley-interscience John Wiley & Sons, Inc., New York, 1969).

As the capacitance of the depletion layer 119 is rather small (the impedance is high), a large amount of voltage applied for data erasing is applied across the depletion layer 119, and no sufficient voltage is applied across the second insulating layer 113, so that the tunnel effect of the electron hole tends to be almost ineffective. This tendency becomes more apparent since an increase of the voltage for data erasing causes an increase of the impedance of the depletion layer in accordance with two-dimensional spreading of the depletion layer 119. This problem is considered to be the main cause of failure in effective data erasing with the conventional technologies.

In the data recording apparatus according to the present embodiment, the phenomenon in the case of data erasing is focused on for solving the problem. Specifically, a minute recording bit area 17 and a separation area (the third insulating layer 16) which is an area other than the recording bit area, i.e., area separating each recording bit area 17, are provided on the recording medium 10 as shown in FIG. 1C. Hence, the recording bit area 17 is separated by the separation area (the third insulating layer 16) into individual recording bit area 17 and arranged in a regular pattern.

In the data recording apparatus according to the present embodiment, the depth of the separation area (the third insulating layer 16) in the semiconductor substrate 11 is formed so as to be more than $W_{max}$ which is calculated using Equation (1) as the maximum depth of the depletion layer at the time of data erasing. Since the depth of the separation area (the third insulating layer 16) buried in the semiconductor substrate 11 is formed to be more than $W_{max}$, i.e., the maximum depth of the depletion layer at the time of data erasing, the depletion layer 19 generated at the time of data erasing is prevented from spreading toward the horizontal direction of the recording medium 10, and thereby the problem as described above can be solved.

In other words, in the data recording apparatus according to the present embodiment, preventing the depletion layer 19 from spreading in the horizontal direction of the recording medium 10 allows suppressing of the voltage to be applied across the depletion layer 19 out of the applied voltage for data erasing, so that sufficient voltage for data erasing is applied across the second insulating layer 13. Thus, an electron hole is surely accumulated from the semiconductor substrate 11 to the second insulating layer 13 through the first insulating layer 12 due to the tunnel effect, and thereby data erasing can securely achieved.

Moreover, in the data recording apparatus according to the present embodiment, since the separation area (the third insulating layer 16) is formed to physically prevent the depletion layer 19 from spreading toward the horizontal direction of the recording medium 10, the impedance of the depletion layer 19 is not increased in accordance with two-dimensional spreading of the depletion layer 19 even when the voltage for data erasing is increased.

Accordingly, compared with the conventional technologies in which the recording bit area 17 is not arranged in a pattern regulated by the third insulating layer 16 on the recording medium 10, the data recording apparatus according to the present embodiment allows a significant reduction of the time necessary for data erasing, and the voltage (amplitude of the voltage pulse and the pulse width) which is applied to the needle electrode for data erasing, to as much time and voltage as necessary for data recording. The data recording apparatus according to the present embodiment is advantageous in that a data recording apparatus with high density, high capacity, and long-term storage of data as well as low cost can be provided, allowing high speed and effective data erasing with as much voltage amount as necessary for data recording.

Next, a method for manufacturing the data recording apparatus with above-described structure according to the present embodiment will be described. First, for manufacturing the recording medium 10, a silicon oxide film ($SiO_2$) whose thickness is approximately sub-nanometers to 2 nanometers, for example is formed via a thermal oxidation on the semiconductor substrate 11 as the first insulating layer 12. Here, the semiconductor substrate 11 is a singlecrystal substrate or a polycrystal substrate consisting of an n-type silicon or a p-type silicon. Then, a silicon nitride film ($Si_3N_4$) whose thickness is approximately several nanometers to several tens of nanometers, for example is formed via the chemical vapor deposition (CVD) method or the like as the second insulating layer 13 having an electric charge accumulating function on the silicon oxide film ($SiO_2$) as the first insulating layer 12.

Then, by using the imprinting technology and the etching technology, the recording bit area to be arranged in a regular pattern and the separation area which is an area other than the recording bit area, i.e., area separating each recording bit area are formed. In the separation area, a groove is formed so as to penetrate from the surface of the second insulating layer 13 and to have a predetermined depth of the semiconductor substrate 11. When the groove is formed, the depth (distance) W1 from the interface between the semiconductor substrate 11 and the first insulating layer 12 to the bottom of the groove is formed so as to be more (farther) than $W_{max}$ which is calculated using Equation (1).

In the groove (area other than the recording bit area) created from the surface of the second insulating layer 13 to the semiconductor substrate 11 via the imprinting technology and the etching technology, an insulating material such as $SiO_2$, $Si_3N_4$, $Al_2O_3$, and organic polymeric material is formed via the lift-off technology or the like, as the third insulating layer 16. Then, the surface of the substrate is plated, a carbon layer is, for example, formed on the substrate as the protection layer 14 via the CVD technology or the like with a thickness of several atomic layers or less, a lubricant (not shown) is thinly coated thereon, and thereby the recording medium 10 is completed.

For manufacturing the recording and reproducing needle electrode 42, a metal film such as tungsten or the like is formed on the needle electrode support body 41 which is made of insulating materials such as alumina, ceramics, and sapphire, via the sputtering technology or the deposition technology for example. Then, the recording and reproducing probe 40 is completed through the etching process and a process for forming the protection film (not shown).

The data recording apparatus according to the present embodiment is completed by connecting the recording and erasing controller (circuit) 50 to the recording and reproducing needle electrode 42 of the recording and reproducing probe 40.

Figure 3:
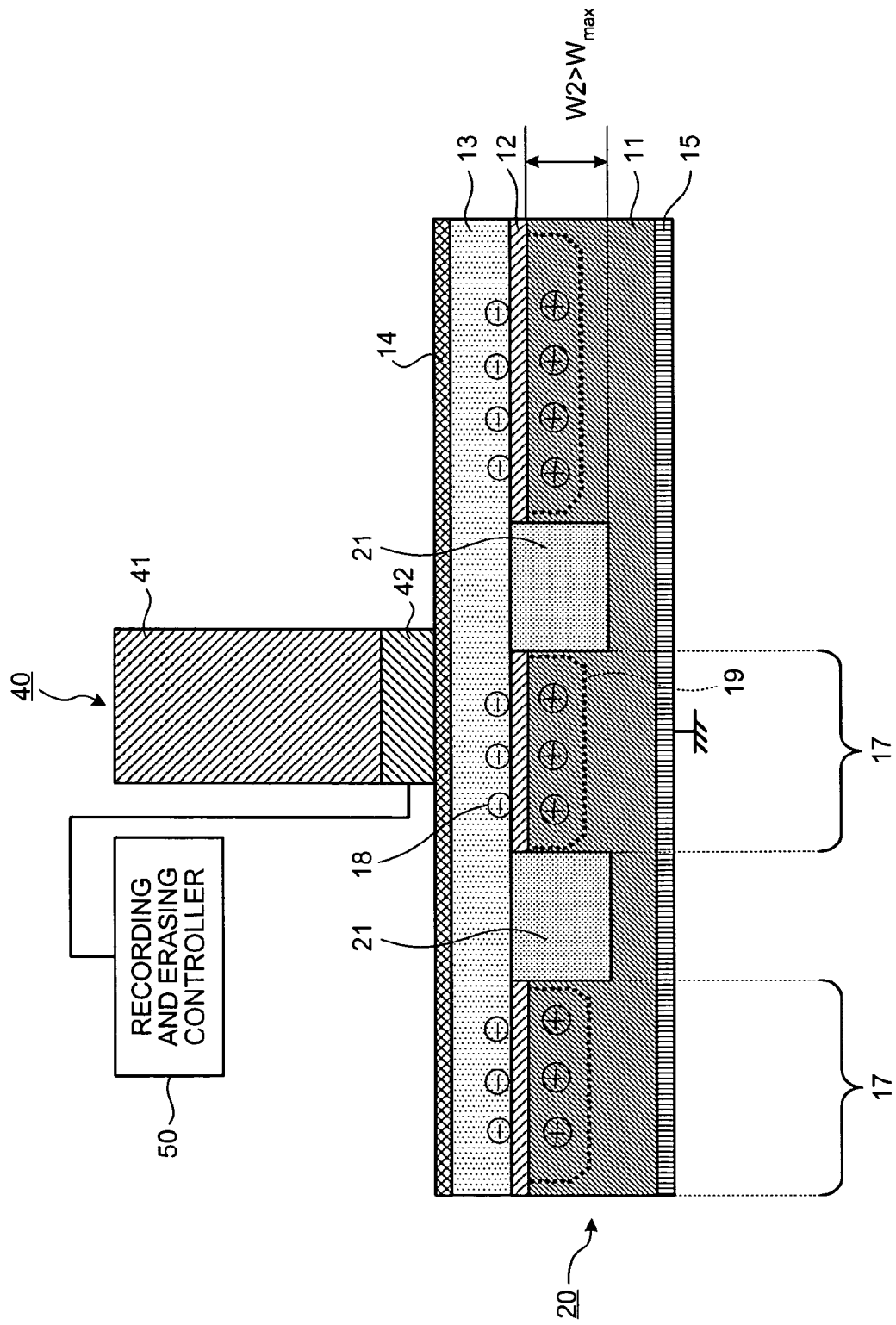
FIG. 3 shows a data recording apparatus according to a second embodiment of the present invention.

A second embodiment, which is a modification of the data recording apparatus according to the first embodiment, will be explained below. FIG. 3 shows a main structure of a data recording apparatus according to the second embodiment. Similar to the data recording apparatus according to the first embodiment, the data recording apparatus according to this embodiment realizes high speed recording, reproducing, and erasing of data with high capacity, and employs a semiconductor-based recording medium having the Metal Nitride Oxide Semiconductor (MNOS) structure which allows long-term storage of the recorded data.

The basic structure of the data recording apparatus according to the present embodiment is the same as that of the data recording apparatus according to the first embodiment. Therefore, the same members as those of the data recording apparatus according to the first embodiment are labeled with the same reference numbers as shown in FIG. 1A, and the detailed explanation is omitted here with reference to the description in the first embodiment.

The data recording apparatus according to the present embodiment differs from the data recording apparatus according to the first embodiment in that a third insulating layer 21, which is instead of the third insulating layer 16, is formed from the surface of the first insulating layer 12 to a predetermined depth of the semiconductor substrate 11 as shown in FIG. 3. Specifically, the data recording apparatus according to the present embodiment includes a recording medium 20 having the MNOS structure; the recording and reproducing probe 40; and the recording and erasing controller (circuit) 50, as shown in FIG. 3.

The recording medium 20 includes the semiconductor substrate 11; the first insulating layer 12 which is formed on one surface of the semiconductor substrate 11; the second insulating layer 13 which is formed on the first insulating layer 12 and has the charge accumulating function; the protection layer 14 which is formed on the second insulating layer 13; the lubricant (not shown) which is coated on the protection layer 14; the electrode layer 15 which is formed on the other surface of the semiconductor substrate 11; and the third insulating layer 21 which is formed from the surface of the first insulating layer 13 to a predetermined depth of the semiconductor substrate 11.

In the data recording apparatus according to the present embodiment, the recording bit area 17 is arranged on the surface of the semiconductor substrate 11 in a pattern regulated by the third insulating layer 21. In the recording medium 20 according to the present embodiment, the surface of the semiconductor substrate 11 has the recording bit area 17 and a separation area (the third insulating layer 21) which is an area other than the recording bit area 17, i.e., area separating each recording bit area 17. Specifically, the recording bit area 17 is separated by the separation area (the third insulating layer 21) into individual recording bit area 17 and regularly arranged on the surface of the semiconductor substrate 11.

In the data recording apparatus according to the present embodiment, the depth (distance) W2 from the interface between the semiconductor substrate 11 and the first insulating layer 12 to the bottom of the third insulating layer 21, is more (farther) than $W_{max}$ which is calculated using Equation (1).

The maximum depth of the third insulating layer 21 is assumed to be approximately two to three times the $W_{max}$ in the light of manufacturing cost and process.

In the data recording apparatus having such a structure according to the present embodiment, since the depth (distance) W2 from the interface between the semiconductor substrate 11 and the first insulating layer 12 to the bottom of the third insulating layer 21 is set to a specific depth (distance) as described, the depletion layer 19 will not spread from the recording bit area 17 of the recording medium 20 two-dimensionally toward a horizontal direction of the semiconductor substrate 11 at the time of data erasing.

In other words, in the data recording apparatus according to the present embodiment, the depth of the third insulating layer 21 in the semiconductor substrate 11 is formed so as to be more than $W_{max}$ which is calculated using Equation (1) as the maximum depth of the depletion layer at the time of data erasing. Thus, since the depth of the separation area (the third insulating layer 21) buried in the semiconductor substrate 11 is formed to be more than $W_{max}$, i.e., the maximum depth of the depletion layer at the time of data erasing, the depletion layer 19 generated at the time of data erasing is prevented from spreading toward the horizontal direction of the recording medium 20.

In the data recording apparatus according to the present embodiment, preventing the depletion layer 19 from spreading toward the horizontal direction of the recording medium 20 allows suppressing of the voltage to be applied across the depletion layer 19 out of the applied voltage for data erasing, so that sufficient voltage for data erasing is applied across the second insulating layer 13. Thus, an electron hole is surely accumulated from the semiconductor substrate 11 to the second insulating layer 13 through the first insulating layer 12 due to the tunnel effect, so that data erasing can be securely and effectively achieved at high speed with low voltage for data erasing (amplitude of the voltage pulse and the pulse width).

Moreover, in the data recording apparatus according to the present embodiment, since the separation area (the third insulating layer 21) is formed to physically prevent the depletion layer 19 from spreading toward the horizontal direction of the recording medium 20, the impedance of the depletion layer 19 is not increased in accordance with two-dimensional spreading of the depletion layer 19 even when the voltage for data erasing is increased.

Accordingly, compared with the conventional technologies in which the recording bit area 17 is not arranged in a pattern regulated by the third insulating layer 21 in the recording medium 20, the data recording apparatus according to the present embodiment allows a significant reduction of the time necessary for data erasing and the voltage (amplitude of the voltage pulse and the pulse width) which is applied to the needle electrode for data erasing, to as much time and voltage as necessary for data recording. The data recording apparatus according to the present embodiment is advantageous in that a data recording apparatus with high density, high capacity, and long-term storage of data as well as low cost can be provided, allowing high speed and effective data erasing with as much voltage amount as necessary for data recording.

The data recording apparatus according to the present embodiment can be manufactured in the same manner as the data recording apparatus according to the first embodiment of the present invention.

Figure 4:
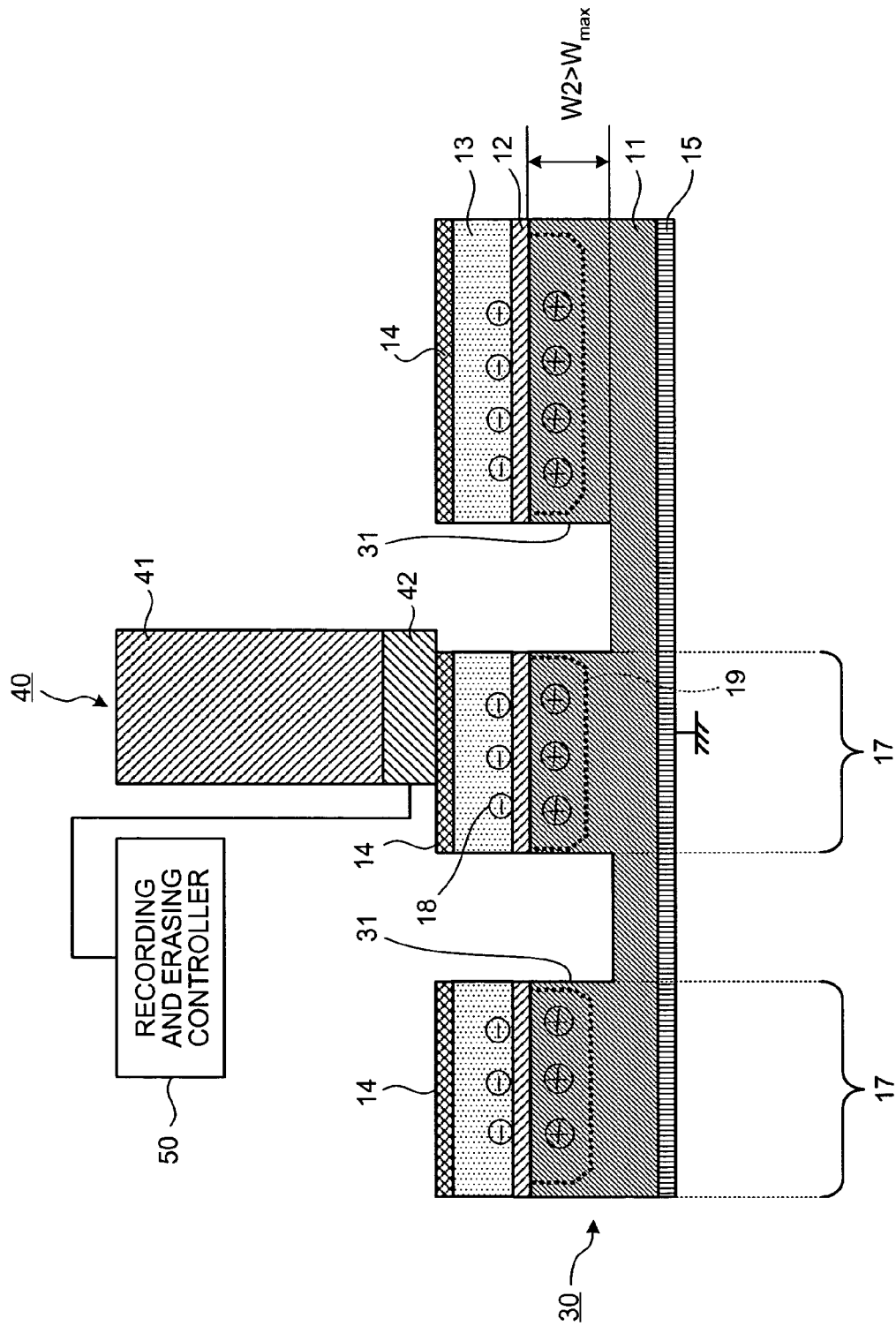
FIG. 4 shows a data recording apparatus according to a third embodiment of the present invention.

A third embodiment, which is another modification of the data recording apparatus according to the first embodiment, will be explained. FIG. 4 shows a main structure of a data recording apparatus according to the third embodiment of the present invention. Similar to the data recording apparatus according to the first embodiment, the data recording apparatus according to the present embodiment realizes high speed recording, reproducing, and erasing of data with high capacity, and employs a semiconductor-based recording medium having the MNOS structure, which allows long-term storage of the recorded data.

The basic structure of the data recording apparatus according to the present embodiment is the same as that of the data recording apparatus according to the first embodiment. Therefore, the same members as those of the data recording apparatus according to the first embodiment are labeled with the same reference numbers as shown in FIG. 1A, and the detailed explanation is omitted here with reference to the description in the first embodiment.

The data recording apparatus according to the present embodiment differs from the data recording apparatus according to the first embodiment in that a groove 31, which is instead of the third insulating layer 16, is formed from the surface of the protection layer 14 to a predetermined depth of the semiconductor substrate 11 as shown in FIG. 4. Specifically, the data recording apparatus according to the present embodiment includes a recording medium 30 having the MNOS structure; the recording and reproducing probe 40; and the recording and erasing controller (circuit) 50, as shown in FIG. 4.

The recording medium 30 includes the semiconductor substrate 11; the first insulating layer 12 which is formed on one surface of the semiconductor substrate 11; the second insulating layer 13 which is formed on the first insulating layer 12 and has the electric charge accumulating function; the protection layer 14 which is formed on the second insulating layer 13; the lubricant (not shown) which is coated on the protection layer 14; the electrode layer 15 which is formed on the other surface of the semiconductor substrate 11; and a groove 31 which is formed from the surface of the protection layer 14 to a predetermined depth of the semiconductor substrate 11.

In the data recording apparatus according to the present embodiment, the recording bit area 17 is arranged on the surface of the recording medium 30 in a pattern regulated by the groove 31. The surface of the recording medium 30 has the recording bit area, and a separation area (the groove 31) which is an area other than the recording bit area, i.e., area separating each recording bit area. Specifically, the recording bit area 17 is separated by the separation area (the groove 31) into individual recording bit area 17 and regularly arranged on the surface of the recording medium 30.

In the data recording apparatus according to the present embodiment, the depth (distance) W3 from the interface between the semiconductor substrate 11 and the first insulating layer 12 to the bottom of the groove 31, is formed to be more (farther) than $W_{max}$ which is calculated using Equation (1).

The maximum depth of the groove 31 is assumed to be approximately two to three times the $W_{max}$ in the light of manufacturing cost and process.

In the data recording apparatus according to the present embodiment, the recording bit area 17 is regulated by the groove 31 on the surface of the recording medium 30. Since the dielectric constant of the area of the groove 31 is the same as the dielectric constant of the air, the dielectric constant of the groove 31 area is still lower than that of the third insulating layer 16 described above. Hence, the data recording apparatus according to the present embodiment allows a data reproduction with higher sensitivity than that according to the first embodiment of the present invention.

In the data recording apparatus having such a structure according to the present embodiment, since the depth (distance) W3 from the interface between the semiconductor substrate 11 and the first insulating layer 12 to the bottom of the groove 31 is set to a specific depth (distance) as described, the depletion layer 19 will not spread from the recording bit area 17 of the recording medium 30 two-dimensionally toward the horizontal direction of the semiconductor substrate 11 at the time of data erasing.

In other words, in the data recording apparatus according to the present embodiment, the depth of the groove 31 in the semiconductor substrate 11 is formed so as to be more than $W_{max}$ which is calculated using Equation (1) as the maximum depth of the depletion layer at the time of data erasing. Thus, since the depth of the separation area (the groove 31) buried in the semiconductor substrate 11 is formed to be more than $W_{max}$, the depletion layer 19 generated at the time of data erasing is prevented from spreading toward the horizontal direction of the recording medium 30.

In the data recording apparatus according to the present embodiment, preventing the depletion layer 19 from spreading toward the horizontal direction of the recording medium 30 allows suppressing of the voltage to be applied across the depletion layer 19 out of the applied voltage for data erasing, so that sufficient voltage for data erasing is applied across the second insulating layer 13. Thus, an electron hole is surely accumulated from the semiconductor substrate 11 to the second insulating layer 13 through the first insulating layer 12 due to the tunnel effect, so that data erasing can securely and effectively achieved at high speed with low voltage for data erasing (amplitude of the voltage pulse and the pulse width).

Moreover, in the data recording apparatus according to the present embodiment, since the separation area (the groove 31) is formed to physically prevent the depletion layer 19 from spreading toward the horizontal direction of the recording medium 30, the impedance of the depletion layer 19 is not increased in accordance with two-dimensional spreading of the depletion layer 19 even when the voltage for data erasing is increased.

Accordingly, compared with the conventional technologies in which the recording bit area 17 is not arranged in a pattern regulated by the groove 31 in the recording medium 30, the data recording apparatus according to the present embodiment allows a significant reduction of the time necessary for data erasing and the voltage (amplitude of the voltage pulse and the pulse width) which is applied to the needle electrode for data erasing, to as much time and voltage as necessary for data recording. The data recording apparatus according to the present embodiment is advantageous in that a data recording apparatus with high density, high capacity, and long-term storage of data as well as low cost, can be provided, allowing high speed and effective data erasing with as much voltage amount as necessary for data recording.

In the data recording apparatus according to the first embodiment, the third insulating layer 16 is formed of insulating material such as silicon oxide ($SiO_2$), silicon nitride ($Si_3N_4$), aluminium oxide ($Al_2O_3$), and organic and polymeric materials filling in this groove 31, for example.

The data recording apparatus according to the present embodiment can be manufactured in the same manner as the information recorder according to the first embodiment of the present invention.

Figure 5:
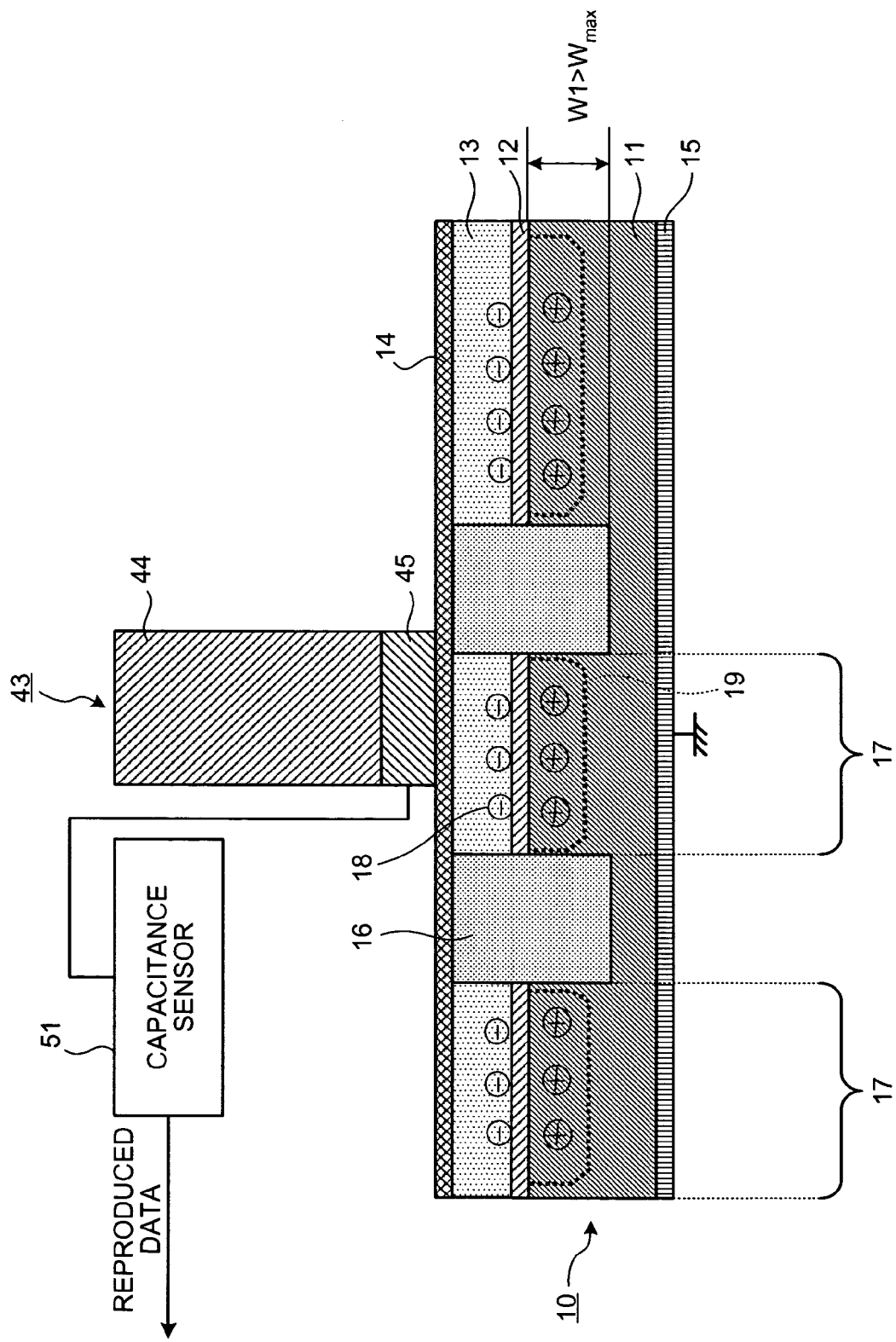
FIG. 5 shows a data recording apparatus according to a fourth embodiment of the present invention.

A fourth embodiment according to the present invention, which is a data recording apparatus incorporated with a capacitance-based reproduction system, will be explained. FIG. 5 shows a main structure of a data recording apparatus according to the fourth embodiment of the present invention.

The data recording apparatus according to the present embodiment is incorporated with a capacitance-based reproduction system, and the basic structure thereof is the same as that of the data recording apparatus according to the first embodiment. Therefore, the same members as those of the data recording apparatus according to the first embodiment are labeled with the same reference number as shown in FIG. 1A, and the detailed explanation is omitted here with reference to the description in the first embodiment.

The data recording apparatus according to the present embodiment differs from the data recording apparatus according to the first embodiment in that a capacitance-based data reproducing probe 43 and a capacitance sensor (circuit) 51 which serve as sensors for reproducing the recorded data. Specifically, the data recording apparatus according to the present embodiment includes the recording medium 10; the capacitance-based data reproducing probe 43; and the capacitance sensor (circuit) 51, as shown in FIG. 5. The capacitance-based data reproducing probe 43 includes a needle electrode support body 44, a reproducing needle electrode 45 which is formed on the bottom surface of the needle electrode support body 44.

Hence, when the data recording apparatus according to the first embodiment adopts the capacitance-based reproduction system, it is possible to realize a data recording apparatus with a simple structure inexpensively, which allows a fine data reproduction with high sensitivity.

In the case of incorporating the capacitance-based reproduction system into the data recording apparatus according to the first embodiment as described in the present embodiment, the material of the third insulating layer 16 is preferably made of a material having a low dielectric constant, and thereby the detection sensitivity can be improved.

Moreover, though in the present embodiment, the structure separately provided with the reproducing needle electrode 45 for the capacitance-based reproduction system is described, it may be configured that the needle electrode is used for both data erasing and data reproducing in the present invention.

Needless to say, the data recording apparatus according to the present embodiment has the same advantage as the data recording apparatus according to the first embodiment that a data recording apparatus with high density, high capacity, and long-term storage of data as well as low cost can be provided, which allows high speed and effective data erasing with as much voltage amount as necessary for data recording.

Figure 6:
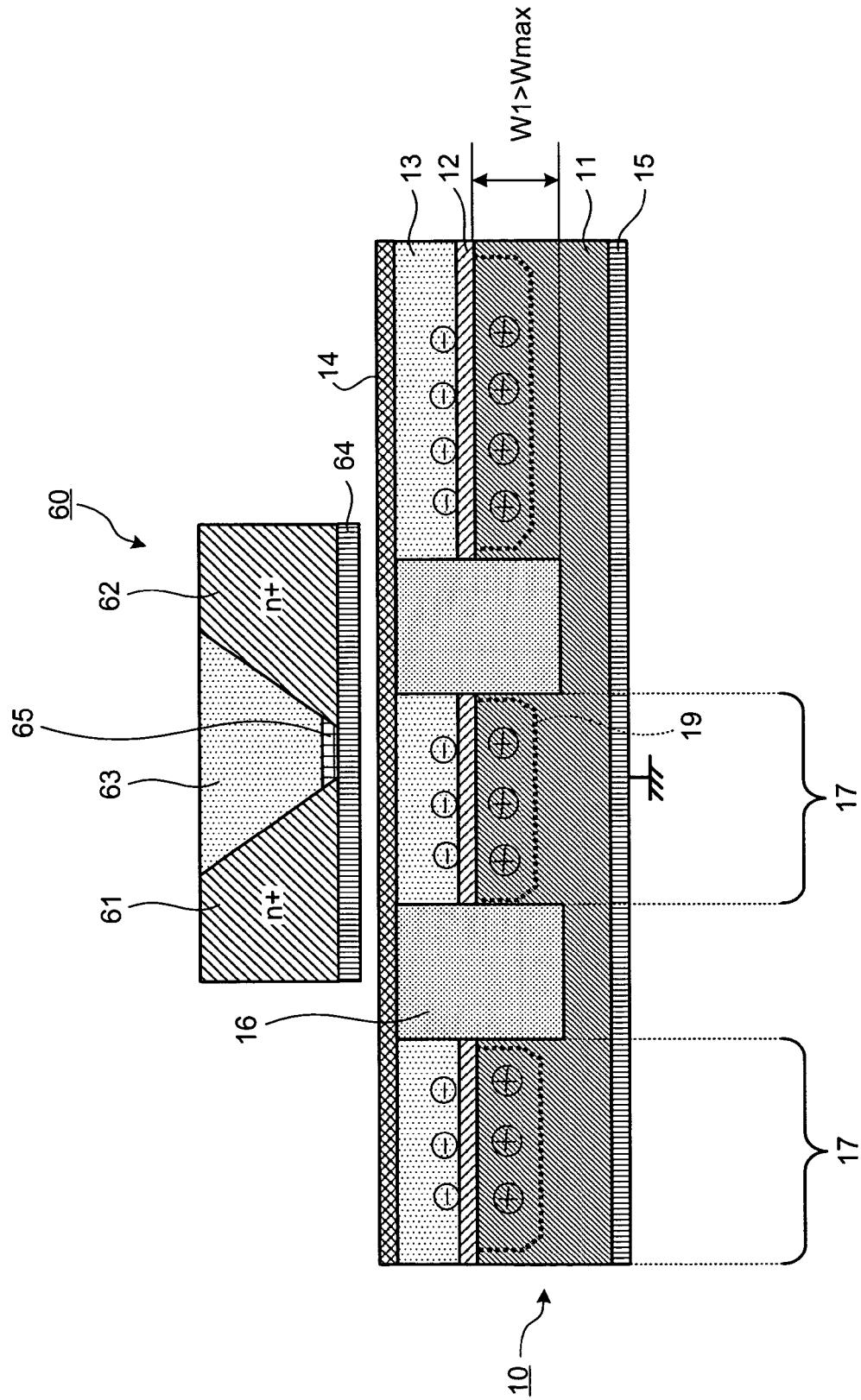
FIG. 6 shows a data recording apparatus according to a fifth embodiment of the present invention.

A fifth embodiment according to the present invention, which is a data recording apparatus incorporated with a recorded data reproducing system with a field effect transistor (FET) sensor, will be explained. FIG. 6 shows a main structure of a data recording apparatus according to the fifth embodiment of the present invention.

In the data recording apparatus according to the present embodiment, a recorded data reproducing system with an FET sensor is incorporated into the data recording apparatus according to the first embodiment, and the basic structure thereof is the same as that of the data recording apparatus according to the first embodiment. Therefore, the same members as those of the data recording apparatus according to the first embodiment are labeled with the same reference number as shown in FIG. 1A, and the detailed explanation is omitted here with reference to the description in the first embodiment.

The data recording apparatus according to the present embodiment differs from the data recording apparatus according to the first embodiment in that the FET sensor which is heretofore known as a sensor for recorded data reproduction is provided. Specifically, the data recording apparatus according to the present embodiment includes the recording medium 10 and the FET sensor 60, as shown in FIG. 6. The FET sensor 60 includes a source ("n+" region) 61, a drain ("n+" region) 62, a P-type silicon-layer 63, an insulating film 64, and an inversion layer 65.

In the recording signal reproduction using the FET sensor, an electric field of the electric charge 18 which is accumulated in the second insulating layer 13 of the recording medium 10 is directly read out by detecting changes in an electric current between the source and the drain of the FET sensor. It should be noted that a description of an electrode is omitted in FIG. 6. Since the depth of the inversion layer changes depending on the change of the electric field, the electric resistance between the source and the drain changes and accordingly the electric current changes.

A utilization of the FET probe technology available in recent years allows a detection of an electric charge of very minute area of nanometer order. This advantage enables the data recording apparatus according to the present embodiment to reproduce the accumulated electric charge which is recorded in a very minute area of several tens of nanometers as recorded data, with high sensitivity, high signal-to-noise ratio, and high response speed.

Needless to say, the data recording apparatus according to the present embodiment has the same advantage as the data recording apparatus according to the first embodiment that a data recording apparatus with high density, high capacity, and long-term storage of data as well as low cost can be provided, which allows high speed and effective data erasing with as much voltage amount as necessary for data recording.

Figure 7A:
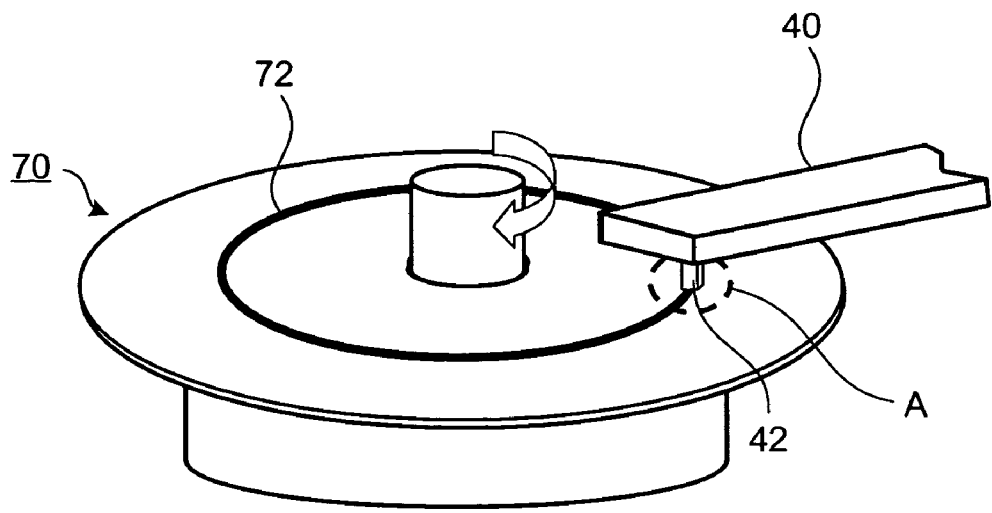
FIG. 7A is a perspective view of a data recording apparatus according to a sixth embodiment of the present invention.

A sixth embodiment according to the present invention, which is a data recording apparatus (disc memory) in which the recording medium 10 according to the first embodiment is formed to be a disc shape, will be explained. FIG. 7A is a perspective view of a main structure of the data recording apparatus according to the present embodiment. The data recording apparatus according to the present embodiment, as shown in FIG. 7A, includes a disc-shaped recording medium 70; the recording and reproducing probe 40 having the recording and reproducing needle electrode 42; and a recording and erasing controller (not shown).

Figure 7B:
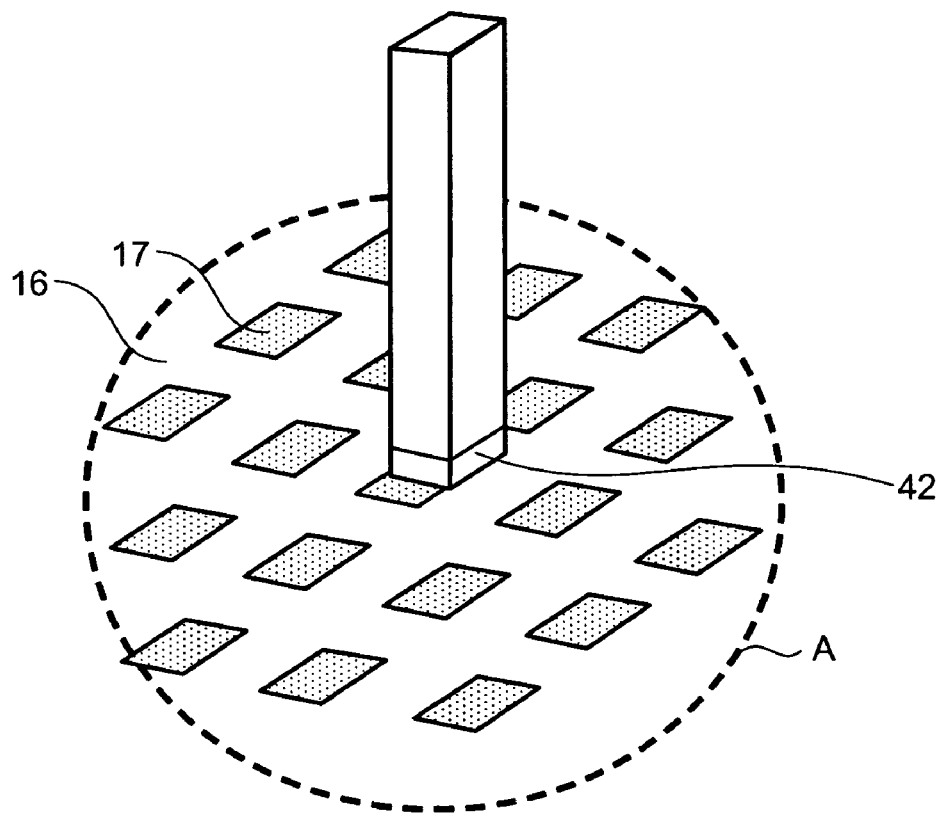
FIG. 7B is an enlarged view of area A of FIG. 7A.

In the disc-shaped recording medium 70, the recording bit area 17 separated by the separation area (the third insulating layer 16) into individual recording bit area 17 is arranged on the surface of the disc-shaped recording medium 70 in a regular pattern, as shown in FIG. 7B which is an enlarged view of area A in FIG. 7A.

In this data recording apparatus, the disc-shaped recording medium 70 is turned around so as to relatively move with respect to the recording and reproducing needle electrode 42, so that data recording, erasing, and reproduction are performed along a line 72 of the recording bit area 17 in a track direction. Thus, by forming the recording medium 10 of the data recording apparatus according to the first embodiment to be like a disc-shape, the data recording apparatus according to the present embodiment can realize data recording, reproduction, and erasing with higher capacity and higher speed.

Needless to say, the data recording apparatus according to the present embodiment has the same advantage as the data recording apparatus according to the first embodiment that a data recording apparatus with high density, high capacity, and long-term storage of data as well as low cost can be provided, which allows high speed and effective data erasing with as much voltage amount as necessary for data recording.

In the present embodiment, though the recording medium 10 according to the first embodiment is modified to have a disc-shape and constitute the data recording apparatus, the recording medium 20 and the recording medium 30 according to the second embodiment and the third embodiment, respectively may be formed to have a disc-shape and constitute the same data recording apparatus.

Figure 8A:
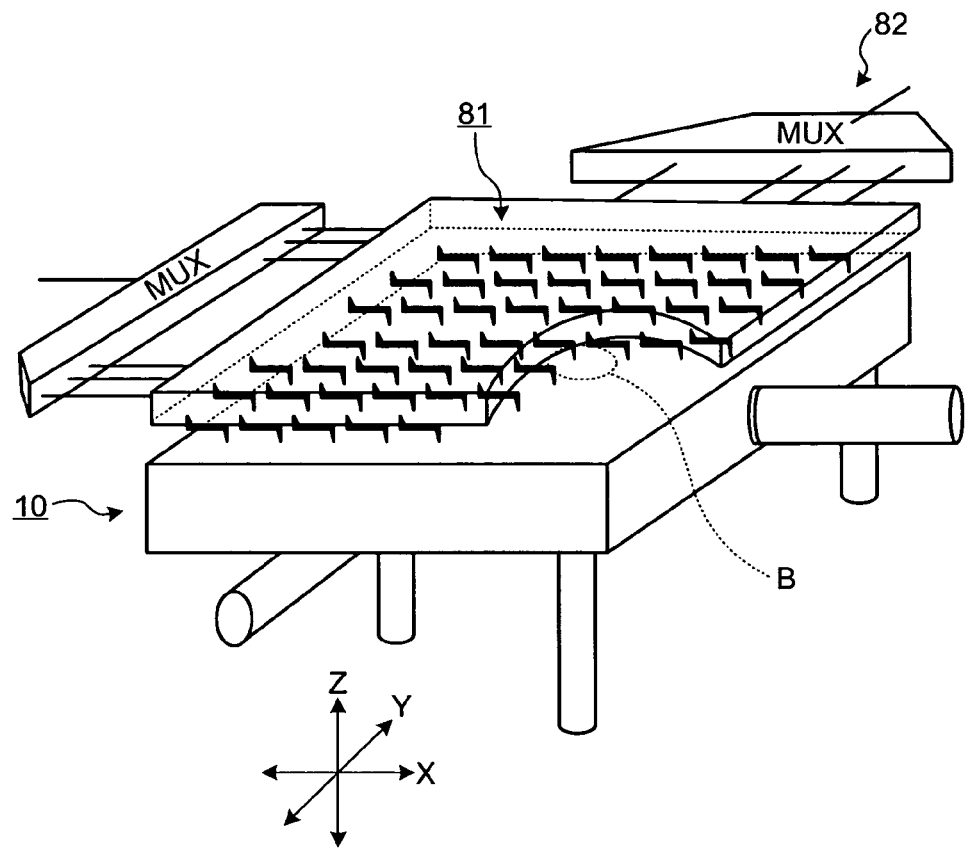
FIG. 8A is a perspective view of a data recording apparatus according to a seventh embodiment of the present invention.

A seventh embodiment according to the present invention, which is a data recording apparatus (multi-probe memory) provided with a two-dimensional probe array to the recording medium 10 according to the first embodiment, will be explained. Specifically the two-dimensional probe array is provided with an arrangement of plural probes for data recording and reproduction. FIG. 8A is a perspective view of a main structure of the data recording apparatus according to the present embodiment. As shown in FIG. 8A, the data recording apparatus according to the present embodiment includes the recording medium 10; a two-dimensional probe array 81 having plurality of probes for data recording and reproduction 40; a multiplexer driver 82; and the recording and erasing controller (not shown).

Figure 8B:
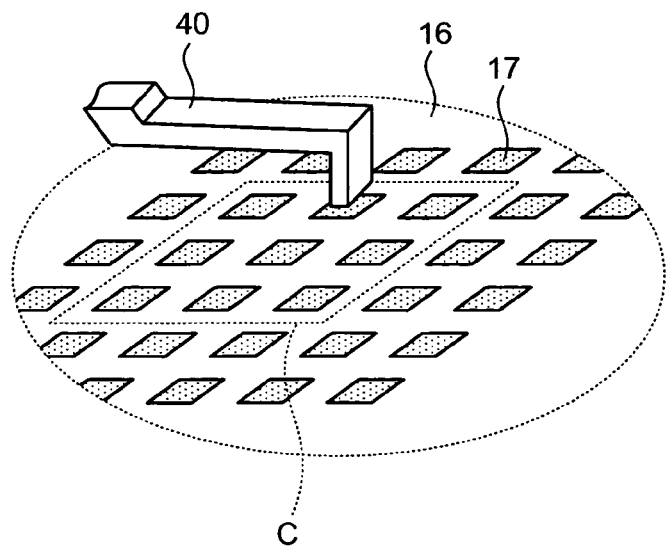
FIG. 8B is an enlarged view of area B of FIG. 8A.

As shown in FIG. 8B, each recording and reproducing probe 40 of the two-dimensional probe array 81 performs data recording, erasing, and reproducing for a plurality of recording bit areas 17 which are present in a predetermined area (area C shown in FIG. 8B, for example). FIG. 8B is an enlarged view of area B in FIG. 8A.

In this data recording apparatus, a plurality of needle electrodes for data recording and reproduction (recording and reproducing probes 40) are provided and made to operate parallel to each other, and thereby multi-channel recording or erasing can be achieved to the recording medium 10. Thus, the data recording apparatus according to the present embodiment allows data recording and erasing in higher density with smaller device.

Needless to say, the data recording apparatus according to the present embodiment has the same advantage as the data recording apparatus according to the first embodiment that a data recording apparatus with high density, high capacity, and long-term storage of data as well as low cost can be provided, which allows high speed and effective data erasing with as much voltage amount as necessary for data recording.

In the present embodiment, though the recording medium 10 according to the first embodiment constitutes the data recording apparatus, the recording medium 20 and the recording medium 30 according to the second embodiment and the third embodiment, respectively may constitute the same data recording apparatus.

The data recording apparatus as described above is advantageous as a recorder which can be provided with small size, high capacity, and high speed as well as low cost, and especially suitable for portable devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data recording apparatus comprising:
a recording medium that includes
a semiconductor substrate;
a first insulating layer which is formed on a first surface of the semiconductor substrate;
a second insulating layer which is formed on the first insulating layer and is made to accumulate electric charge;
an electrode layer which is formed on a second surface of the semiconductor substrate; and
an insulating area which penetrates the first and the second insulating layers and whose bottom is disposed in the semiconductor substrate; and
an electrode that applies a voltage to the recording medium, wherein
a depth from an interface between the semiconductor substrate and the first insulating layer to the bottom of the insulating area is more than a maximum depth of a depletion layer, $W_{max}$ which is represented by $$W_{max} = \sqrt{2\epsilon_0 \epsilon_i \times 2|\phi_f|/qN_d}$$

where $\epsilon_0$ is a dielectric constant of vacuum, $\epsilon_i$ is a relative dielectric constant, $|\phi_f|$ is an absolute value of the Felmi potential of the semiconductor substrate, q is an electric charge of an electron, and $N_d$ is an impurity concentration of the semiconductor substrate.

2. The data recording apparatus according to claim 1, wherein the insulating area is formed of a material such as silicon oxide ($SiO_2$), silicon nitride ($Si_3N_4$), aluminum oxide ($Al_2O_3$), and organic and polymeric materials, filling in a groove which is formed from a surface of the second insulating layer.

3. The data recording apparatus according to claim 1, wherein a dielectric constant of the insulating area is lower than that of the first insulating layer and the second insulating layer.

4. The data recording apparatus according to claim 1, wherein the electrode serves as an electrode for recording, erasing, and reproducing data.

5. The data recording apparatus according to claim 1, wherein the electrode includes a field effect transistor which detects an electric field of an electric charge which is accumulated to the second insulating layer, to reproduce data.

6. The data recording apparatus according to claim 1, wherein the recording medium has a disk-shape.

7. The data recording apparatus according to claim 1, wherein the electrode includes a plurality of electrodes which are used for multi-channel recording, erasing, and reproducing data on a plurality of recording areas of the recording medium.

8. The data recording apparatus according to claim 1, wherein the electrode is in one of a floating state and a directly contacting state with respect to the recording medium.

* * * * *